J. A. BOWDEN.
TIRE VALVE AND CAP THEREFOR.
APPLICATION FILED MAR. 29, 1916.

1,205,850.

Patented Nov. 21, 1916.

WITNESSES:
René Buine
Gustave R. Thompson

INVENTOR
Junius A. Bowden
By Attorneys,
Fraser, Turk & Myers

UNITED STATES PATENT OFFICE.

JUNIUS A. BOWDEN, OF LOS ANGELES, CALIFORNIA, ASSIGNOR TO A. SCHRADER'S SON, INC., OF BROOKLYN, NEW YORK, A CORPORATION OF NEW YORK.

TIRE-VALVE AND CAP THEREFOR.

1,205,850.	Specification of Letters Patent.	Patented Nov. 21, 1916.

Original application filed May 6, 1913, Serial No. 765,923. Divided and this application filed March 29, 1916. Serial No. 87,401.

*To all whom it may concern:*

Be it known that I, JUNIUS A. BOWDEN, a citizen of the United States of America, residing in Los Angeles, in the county of Los Angeles and State of California, have invented certain new and useful Improvements in Tire-Valves and Caps Therefor, of which the following is a specification.

This invention relates to tire valves and caps therefor, and aims to provide improvements therein.

The present application is a division of my application Serial No. 765,923, filed May 6, 1913.

An object of the invention is to provide a removable cap which is constructed with a rotatable internal disk within which the rubber gasket is confined, and the rubber thereby kept from contact with the revolving surface of the outer portion of the cap, so that when the cap is being removed or applied, the outer portion of the cap will not come in contact with the rubber to distort the same.

A further object of the invention is to provide a cap having means adapted to operate a part of the valve which holds the valve parts in place in the valve casing.

Other advantages of the invention will be brought out in the following description.

Figure 1:
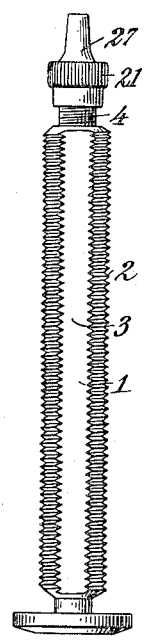
Figure 2:
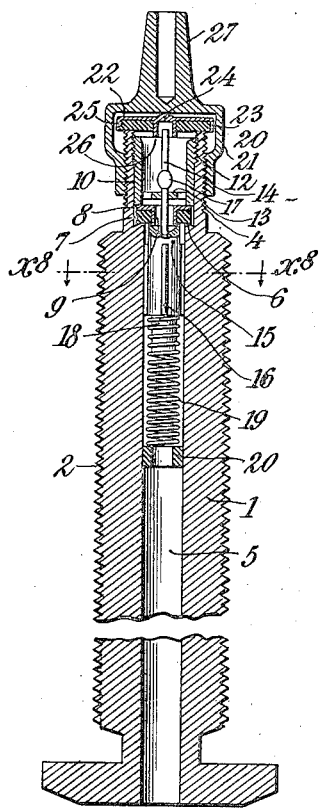
Figure 3:
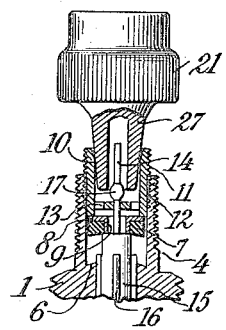
Figure 4:
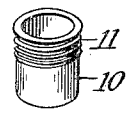
Figure 5:
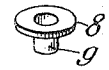
Figure 6:
Figure 7:
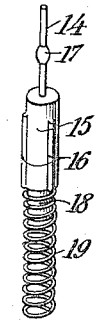
Figure 9:
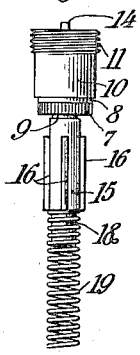
Figure 8:
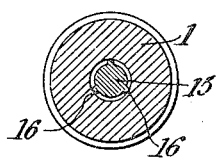

Referring to the drawings,—Figure 1 is a side elevation of the valve. Fig. 2 is an enlarged longitudinal section through the valve. Fig. 3 is a side elevation partly in section of the upper portion of the valve, and showing the cap inverted in position for screwing the valve into or out of position. Fig. 4 is a perspective detail of the retaining sleeve. Fig. 5 is a perspective of the seat supporting disk. Fig. 6 is a perspective of the rubber seat. Fig. 7 is a perspective of the plunger and spring as connected together. Fig. 8 is a section on line $x^8$—$x^8$, Fig. 2. Fig. 9 is a side elevation of the said valve removed as a unit.

1 designates the valve body or casing of the usual construction, with flattened sides 2 and main threaded portion 3 with externally threaded reduced end 4. The casing 1 has a central bore 5 which within the reduced end 4 is enlarged to form a shoulder 6, the latter being guttered as shown, with its inner edge slightly raised to cause a slight indentation in a rubber seat 7, and thereby produce a perfect air closure at this point. The rubber seat 7 is perforated and held in place by a seat retaining disk 8 which is formed with an annular flange 9 extending into the perforated portion of the rubber seat 7 to prevent the seat from contracting the center air hole when it is squeezed between the disk 8 and shoulder 6. Thus the flange 9 maintains the air passage at this point with a uniform area. A retaining sleeve 10 is screwed against the disk 8 to hold the latter and rubber valve seat 7 in position, and the sleeve 10 is provided with external threads 11 for a definite portion of its length, and the reduced portion 4 of the casing 1 is internally threaded at 12 for a definite distance such that when the retaining sleeve 10 is screwed to the lowermost point permitted by these threads, it will exert the proper pressure upon the rubber seat 7 to effect a perfect air closure without undue compression of the rubber.

The retaining sleeve 10 is provided with a bridge 13 preferably integral therewith, and slidably extending through the bridge 13 is a valve pin 14 which carries a valve 15, the upper surface of which is concave as shown, thereby forming an edge which is adapted to slightly indent the rubber seat 7 to form a perfect airtight seat therewith. The pin 14 is driven into the valve 15 with sufficient friction to retain the valve permanently in the desired position, and the valve 15 is provided with a series of longitudinal ribs 16 which slide against the inner wall of the passage 5 and thereby maintain the valve in perfect alinement with the seat 7, insuring a proper fit therewith at all times.

The valve 15 is of less diameter than the bore 5 to afford the necessary air passage and the ribs 16 maintain it in central position. The pin 14 is provided with an enlargement 17 above the bridge 13 to cause the pin and valve to be lifted with the sleeve 10 whenever the latter is removed, and to also thereby cause the disk 8 and seat 7 to be likewise removed, they being lifted by the valve 15. The lower end of the valve 15 has a reduced portion 18 to which is secured one end of a compression spring 19, the inner end of the spring 19 bearing against a sleeve 20 which is frictionally retained in the bore 5 of the casing 1, with sufficient friction to form a permanent seat for the inner end of the spring.

The enlargement 17 is at a point sufficiently above the bridge 13 to permit the pin 14 to be displaced the required distance to open the valve 15 for the passage of air past the valve, and it acts to hold all of the parts of the inner valve together, viz., seat 7, sleeve 10, seat supporting disk 8 with flange 9, valve 15 and spring 19 so that these parts are all removed as a unit and remain together after being removed. This prevents loss of any of the parts or disarrangement, and enables the valve to be easily reinserted in position and insures the proper relations of the parts when reinserted.

20 is the outer valve cap which is screwed on the reduced threaded portion 4 of the valve casing. The valve cap 20 has an enlarged portion 21 within which is located a plate 22 with an outer depending flange 23, and with a center projection 24 adapted to bear against the center of the inner wall of the enlarged portion 21 and form a pivot upon which the cap 20 turns when being screwed in either direction. A rubber seat 25 is retained in the plate 22 and the plate 22 has a depending center annular flange 26 which prevents the rubber 25 from contracting the size of its center orifice when it is squeezed against the outer rim of the end of the valve casing 1. The perforated portion of the rubber 25 is to receive the outer end of the valve pin 14 when the cap 20 is screwed down tight, and thereby preventing unseating the valve 15.

The cap 20 has a hollow tapered extension 27 which by inserting the cap as shown in Fig. 3, is adapted to be inserted into the retaining sleeve 10 and wedged therein with sufficient friction to turn the retaining sleeve into or out of position by rotating the cap 20. The important advantage of this feature is that while sufficient friction is afforded for screwing the retaining sleeve into its innermost position and place the rubber seat 7 under the requisite tension, that it will automatically slip when such position has been reached and prevent undue pressure being brought to bear upon the parts when screwing the valve into position.

What I claim is:—

1. In a tire valve, a body with an externally threaded end, an internally threaded cap adapted to screw thereon, said cap having an inner enlarged portion, a plate revoluble within the cap in said enlarged portion, said plate having a flange at its outer edge and having a central annular flange and an annular rubber seat in the space between the annular flange and outer flange adapted to bear against the outer edge of the body when the cap is screwed down.

2. In a tire valve, a body having a threaded end, an internally threaded cap screwed thereon, said cap having an enlarged portion with an imperforate transverse wall, a plate in said enlarged portion with a central stud pivoted against said imperforate wall, said plate having a central annular flange, and having a peripheral flange, and a rubber seat between said flanges adapted to bear against the outer end of the body.

3. In a tire valve, a body having an interior bore, an inner valve, a retaining sleeve screwed in the outer end of said bore to retain the inner valve in position, and a cap on the end of said body, said cap having a conical outer end adapted to be fitted and wedged into the said retaining sleeve and frictionally grip with the walls thereof, to screw the sleeve when the cap is engaged therewith and rotated.

4. In a tire valve, a body having an interior bore, an inner valve in said bore with a pin extending to the outer end of the body, a retaining sleeve screwed into the end of the bore for retaining the end of the valve, a cap screwed on the outer end of the body, said cap having a hollow conical extension which when the cap is inverted is adapted to fit within the retaining sleeve, said pin being received in the hollow portion of said conical extension, and the tapered walls of the extension adapted to wedge with sufficient friction against said retaining sleeve to rotate the same when the cap is turned.

In witness whereof, I have hereunto signed my name in the presence of two subscribing witnesses.

JUNIUS A. BOWDEN.

Witnesses:
J. C. LADEVEZE,
C. A. KINNEY.